United States Patent
Yasui et al.

(10) Patent No.: US 11,226,485 B2
(45) Date of Patent: Jan. 18, 2022

(54) IMAGE PROJECTION DEVICE AND MOVING BODY

(71) Applicant: Ricoh Company, Ltd., Tokyo (JP)

(72) Inventors: Maiko Yasui, Kanagawa (JP); Tomohiro Nakajima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 209 days.

(21) Appl. No.: 16/352,421

(22) Filed: Mar. 13, 2019

(65) Prior Publication Data

US 2019/0285887 A1  Sep. 19, 2019

(51) Int. Cl.
  *G02B 27/01* (2006.01)
  *G02B 5/10* (2006.01)
  *B60K 35/00* (2006.01)

(52) U.S. Cl.
  CPC .......... *G02B 27/0101* (2013.01); *B60K 35/00* (2013.01); *G02B 5/10* (2013.01); *G02B 27/0149* (2013.01); *B60K 2370/31* (2019.05); *B60K 2370/334* (2019.05)

(58) Field of Classification Search
  CPC .. G02B 27/0101; G02B 5/10; G02B 27/0149; B60K 35/00
  USPC ........................................................ 359/631
  See application file for complete search history.

(56) References Cited

U.S. PATENT DOCUMENTS

| 6,992,578 | B2 | 1/2006 | Aoki et al. |
| 8,878,843 | B2 * | 11/2014 | Koga ..................... B60K 35/00 345/419 |
| 9,423,615 | B2 | 8/2016 | Sato et al. |
| 10,031,343 | B2 | 7/2018 | Saisho et al. |
| 2013/0279016 | A1 | 10/2013 | Finger |
| 2015/0098029 | A1 | 4/2015 | Sato et al. |
| 2017/0315351 | A1 * | 11/2017 | Yamazoe ........... G02B 27/0101 |

(Continued)

FOREIGN PATENT DOCUMENTS

| EP | 2 843 652 A1 | 3/2015 |
| JP | 62-275846 A | 11/1987 |
| JP | H04-057882 U | 5/1992 |

(Continued)

OTHER PUBLICATIONS

Extended European Search Report dated Aug. 5, 2019 in European Patent Application No. 19162346.1, 8 pages.

(Continued)

*Primary Examiner* — James R Greece
(74) *Attorney, Agent, or Firm* — Xsensus LLP

(57) ABSTRACT

An image projection device includes an image generation unit configured to generate a projection image; a magnifying optical system configured to magnify the projection image generated by the image generation unit and project the magnified projection image onto a projection plane; and an enclosure having an inner wall surface and being configured to accommodate the image generation unit and the magnifying optical system. The inner wall surface of the enclosure is disposed avoiding an area where converging magnification of converged incident light exceeds 15 times, the converged incident light resulting from incident light incident from outside of the enclosure onto the magnifying optical system being propagated in a direction opposite to the projection image.

11 Claims, 14 Drawing Sheets

(56) References Cited

U.S. PATENT DOCUMENTS

2018/0252916 A1  9/2018  Nakamura et al.

FOREIGN PATENT DOCUMENTS

| | | | |
|---|---|---|---|
| JP | 2004-347633 | A | 12/2004 |
| JP | 2005-331624 | | 12/2005 |
| JP | 2006-011168 | | 1/2006 |
| JP | 3936653 | | 6/2007 |
| JP | 2012-058270 | A | 3/2012 |
| JP | 2015-087422 | A | 5/2015 |
| JP | 2017-044858 | A | 3/2017 |
| JP | 6135048 | | 5/2017 |
| JP | 2018-116156 | A | 7/2018 |

OTHER PUBLICATIONS

Office Action dated Sep. 10, 2021 in Japanese Patent Application No. 2018-050151, 5 pages.

* cited by examiner

IMAGE PROJECTION DEVICE AND MOVING BODY

CROSS-REFERENCE TO RELATED APPLICATIONS

The present application is based on and claims priority to Japanese Patent Application No. 2018-050151, filed on Mar. 16, 2018, the contents of which are incorporated herein by reference in their entirety.

BACKGROUND OF THE INVENTION

1. Field of the Invention

The disclosures discussed herein relate to an image projection device and a moving body.

2. Description of the Related Art

Conventional image projection devices are known in the art, and such an image projection device is typically provided with an image generation unit configured to generate a projection image; a magnifying optical system configured to magnify the projection image generated by the image generation unit and project the magnified projection image on a projection surface; and an enclosure configured to accommodate the image generation unit and the magnifying optical system. Japanese Patent No. 6135048 (Patent Document 1), for example, discloses an image projection device configured to detect the intensity of external light propagating in an optical path of display light (projection image) in a direction opposite to the display light, and to control the output of the backlight of the liquid crystal display device when the estimated temperature of the liquid crystal display device (image generation unit) obtained based on the detection result exceeds a threshold value. According to the image projection device disclosed in Patent Document 1, damage to the liquid crystal display device due to external incident light may be avoided as much as possible by lowering the luminance of the liquid crystal display device or by turning off the backlight of the liquid crystal display device when the estimated temperature exceeds the threshold value.

RELATED-ART DOCUMENT

Patent Document

Patent Document 1: Japanese Patent No. 6135048

SUMMARY OF THE INVENTION

However, when external light enters the image projection device, the external light is incident not only on the image generation unit such as a liquid crystal display device but is also incident on an inner wall of the enclosure that accommodates the image generation unit and other structural components. The external light incident on the enclosure raises the temperature of the enclosure to exceed the heat-resistant temperature of the enclosure, which may damage the enclosure.

According to at least one embodiment, an image projection device includes an image generation unit configured to generate a projection image;

a magnifying optical system configured to magnify the projection image generated by the image generation unit and project the magnified projection image onto a projection plane; and an enclosure configured to accommodate the image generation unit and the magnifying optical system, wherein an inner wall surface of the enclosure is disposed avoiding an area where converging magnification of the incident light exceeds 15 times, the converged incident light resulting from incident light incident from outside of the enclosure onto the magnifying optical system is converged by being propagated in a direction opposite to the projection image.

Other objects, features and advantages of the present invention will become more apparent from the following detailed description when read in conjunction with the accompanying drawings.

DETAILED DESCRIPTION OF THE PREFERRED EMBODIMENTS

The following describes an embodiment of a head-up display (HUD) device to which an image projection device according to an embodiment of the present invention may be applied. A head-up display device acting as an image projection device is installed on a moving body such as a vehicle, an aircraft, a ship, and the like, for an example. The installation of the head-up display device allows a user to visually perceive navigation information (information such as speed, mileage) and the like, which is required for navigating a moving body via a windshield (front windshield) of the moving body. In this case, the windshield also functions as a transreflective member to partially pass incident light and partially reflect remainder of the incident light. The following illustrates an example of a head-up display device installed on an automobile (vehicle) acting as a moving body. The head-up display device is provided with a windshield, and a moving unit having a structure for transmitting driving of a driving source, such as an engine or a motor, to driving wheels.

Figure 2:
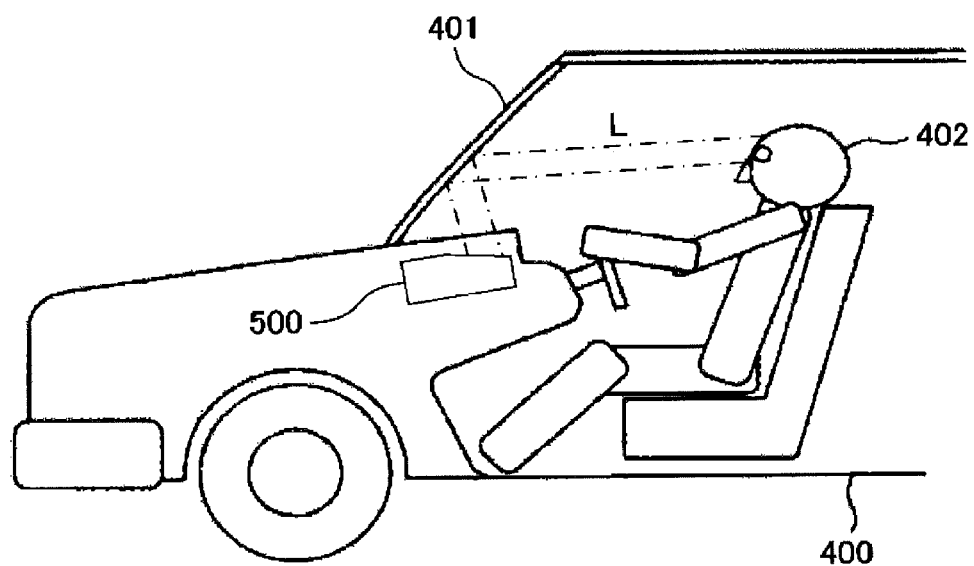
FIG. 2 is a schematic diagram illustrating an example of an automobile equipped with an in-vehicle head-up display device to which an embodiment of the present invention may be applied.
Figure 3:
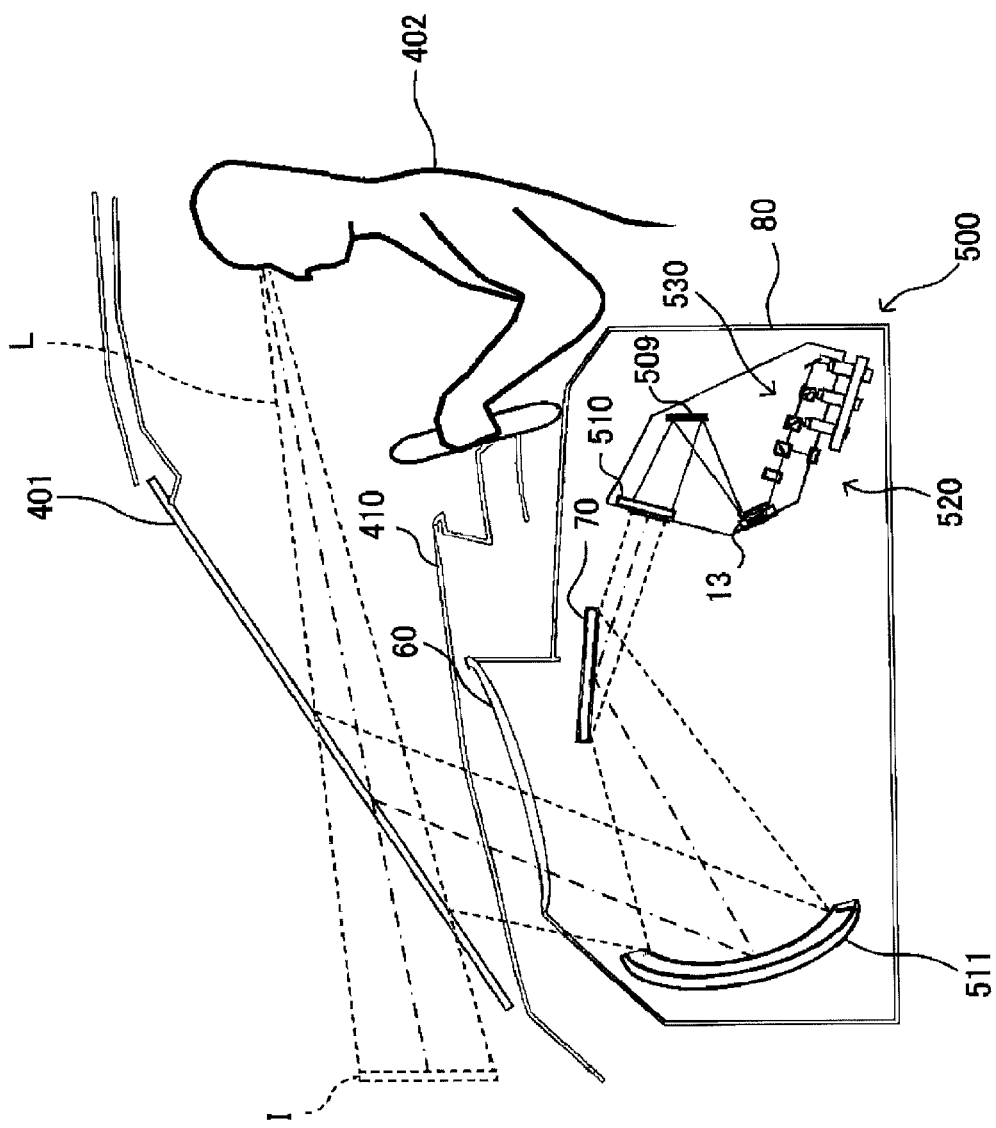
FIG. 3 is a schematic configuration diagram illustrating an example of a head-up display device.
Figure 4:
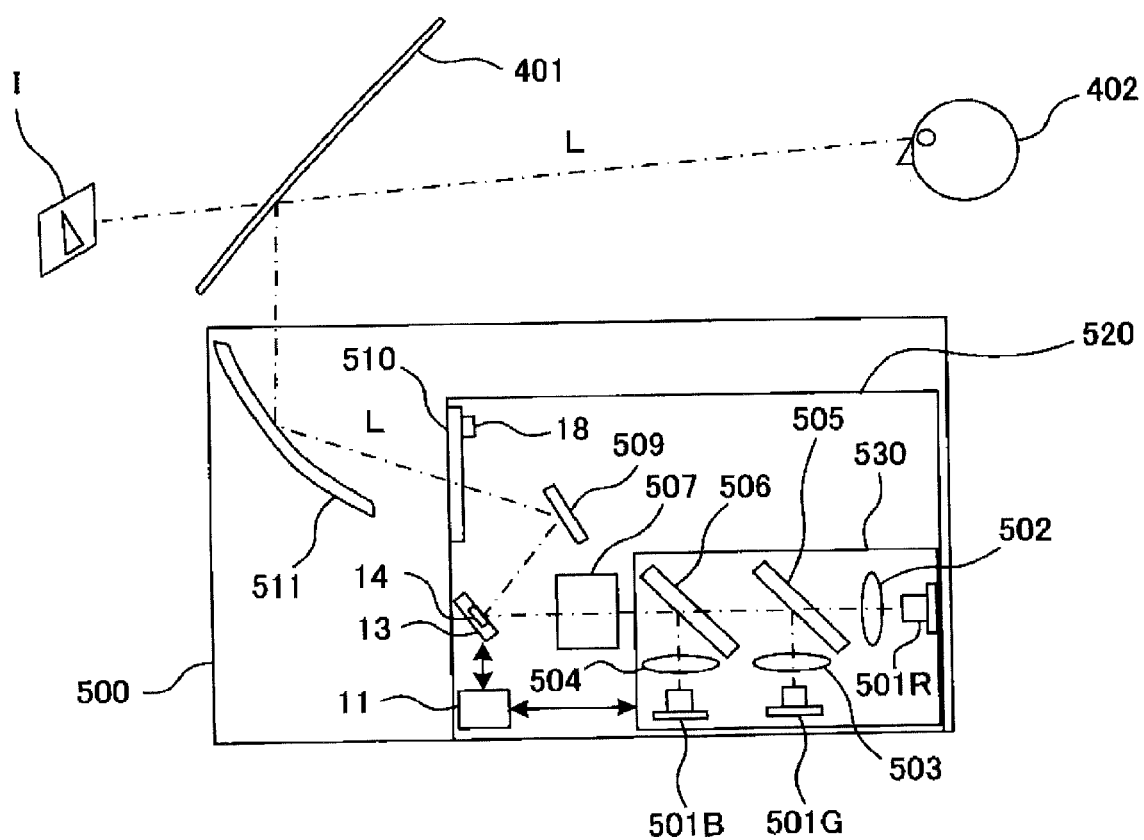
FIG. 4 is a schematic diagram illustrating a head-up display device to which a configuration relating to the image generation unit in FIG. 3 is added.

FIG. 2 is a schematic diagram illustrating an automobile 400 equipped with an in-vehicle head-up display device 500, to which an embodiment of the present invention is applied. FIG. 3 is a schematic configuration diagram illustrating an example of the head-up display device 500. FIG. 4 is a schematic diagram illustrating a head-up display device 500, to which a configuration relating to the image generation unit 520 of the head-up display device 500 illustrated in FIG. 3 is additionally illustrated.

As illustrated in FIGS. 2 and 3, the head-up display device 500 may be installed in, for example, a dashboard 410, in the vicinity of a windshield (windshield 401 etc.) of the automobile 400.

As illustrated in FIG. 3, the head-up display device 500 includes an image generation unit 520, a projection mirror 511 configured by a concave mirror, a cold mirror 70, and a projection enclosure 80 that accommodates these components. The projection enclosure 80 is provided with an opening through which a projection light L directed to the windshield 401 passes, and the opening is provided with a dustproof window 60 in order to prevent foreign matter from entering the projection enclosure 80 from the outside while transmitting the light. The projection light L generated by the image generation unit 520 is incident on an external surface of the projection enclosure 80 via the cold mirror 70 and the projection mirror 511, and then enters the windshield 401. The entered projection light L is subsequently reflected by the windshield 401, and travels to an observer (driver 402) who is a user. As a result, the driver 402 is able to view an image projected by the head-up display device 500 as a virtual image I.

The image generation unit 520 includes a light source unit 530, an optical deflector 13, a free-form surface mirror 509, an intermediate screen 510, and the like. As illustrated in FIG. 4, the light source unit 530 includes three light sources: a red laser light source 501R; a green laser light source 501G; and a blue laser light source 501B. In addition, the light source unit 530 includes three collimator lenses: including a red collimator lens 502, a green collimator lens 503, and a blue collimator lens 504. Further, the light source unit 530 includes a first dichroic mirror 505 and a second dichroic mirror 506, which are unitized by an optical housing. Further, a light amount adjustment unit 507 is disposed between the light source unit 530 and the optical deflector 13.

Laser light is emitted from the red, green, and blue laser light sources (501R, 501G, and 501B). The emitted laser light passes through the collimator lenses (502, 503, and 504) disposed for the respective laser light sources. Three color laser beams are synthesized by passing through an incident optical system, which includes two dichroic mirrors (505, 506) and the light amount adjustment unit 507. The synthesized laser light is guided toward a reflecting surface 14 of the optical deflector 13, and is then deflected by the optical deflector 13.

The optical deflector 13 is a MEMS (Micro Electro Mechanical Systems) fabricated by a semiconductor process or the like, and the reflecting surface 14 is a single micro mirror oscillating with respect to two orthogonal axes. The optical deflector 13 may be a mirror system that includes two mirrors that oscillate/rotate with respect to one axis. The laser light deflected by the optical deflector 13 is reflected by the free-form surface mirror 509, and the reflected light renders a two-dimensional image (intermediate image) on an intermediate screen 510, which is a surface to be scanned (also called "scanning surface"). The projection light L, which is the laser light deflected by the optical deflector 13, passes through a projection optical system including the free-form surface mirror 509, the intermediate screen 510, and the projection mirror 511, and is then projected to the outside of the projection enclosure 80. As illustrated in FIG. 4, an optical receiver 18 is disposed on the intermediate screen 510, and the optical scanning device 10 is adjusted by using the light reception signal from the optical receiver 18.

The intermediate screen 510 has a function of diverging the projection light L at a desired divergence angle, and may preferably have a microlens array structure. The projection light L emitted from the intermediate screen 510 enters the windshield 401 via the projection mirror 511 including a single concave mirror, and a magnified virtual image I is displayed with respect to the driver 402 as a result. The projection mirror 511 is designed to correct an optical distortion element, whereby horizontal lines of the intermediate image formed on the intermediate screen 501 are deformed as an upward or downward curve in a virtual image I due to an effect of the shape of the windshield 401.

The head-up display device 500 projects the intermediate image displayed on the intermediate screen 510 onto the windshield 401 of the automobile 400, such that the driver 402 visually perceives the projected intermediate image as a virtual image I.

The color laser beams emitted from the laser light sources (501R, 501G and 501B) form substantially collimated light beams by the collimator lenses 502, 503 and 504, respectively, which are synthesized by the two dichroic mirrors 505 and 506. The amount of the synthesized laser light is adjusted by the light amount adjustment unit 507, and the synthesized laser light is two-dimensionally scanned by the optical deflector 13 having the reflecting surface 14. The projection light L that has been two-dimensionally scanned by the optical deflector 13 is reflected with distortion correction by the free-form surface mirror 509, and subsequently is converged onto the intermediate screen 510, thereby displaying an intermediate image. The intermediate screen 510 is constituted by a microlens array having two-dimensionally arranged microlenses, and is configured to magnify (enlarge) the projection light L incident on the intermediate screen 510 in units of microlenses.

The optical deflector 13 makes the reflecting surface 14 reciprocate in two axial directions to two-dimensionally scan the projection light L incident on the reflecting surface 14. The drive control of the optical deflector 13 is performed in synchronization with the light emission timing of the laser light sources (501R, 501G, and 501B).

Figure 5:
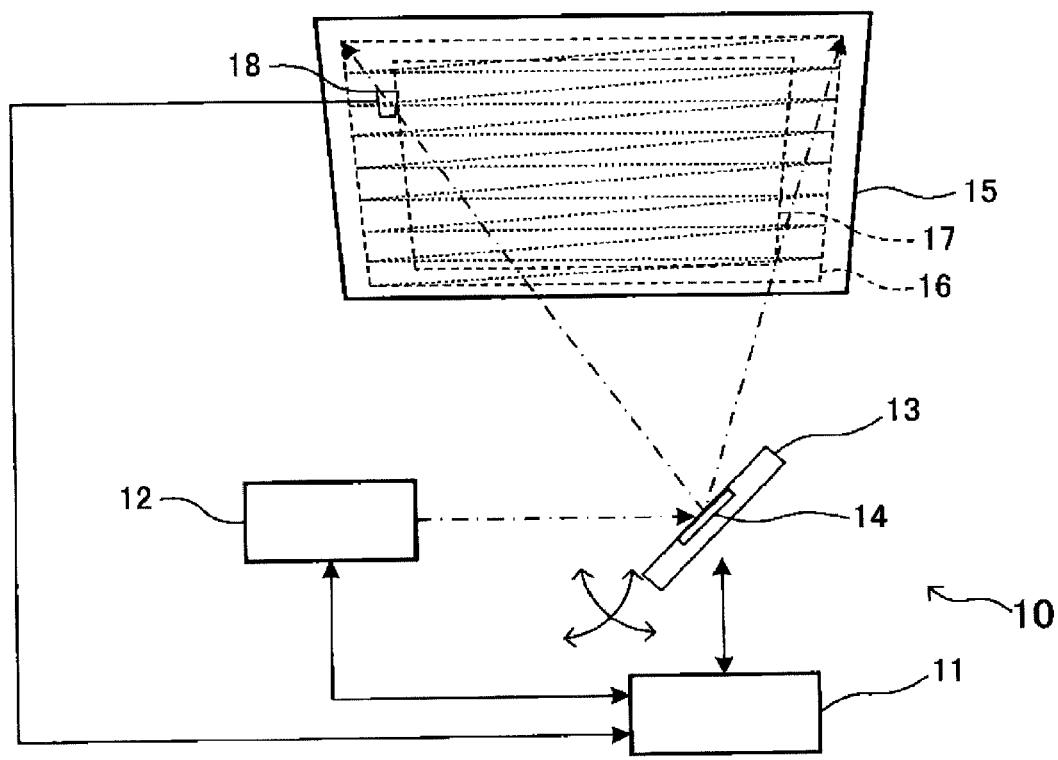
FIG. 5 is a schematic diagram illustrating an example of an optical scanning device according to an embodiment.

The following illustrates a configuration of an optical scanning device of the image generation unit 520 according to the present embodiment for forming an intermediate image on the intermediate screen 510. FIG. 5 is a schematic diagram illustrating an example of an optical scanning device according to the present embodiment.

As illustrated in FIG. 5, the optical scanning device 10 deflects light emitted from the light source device 12 under the control of the control device 11 by the reflecting surface 14 of the optical deflector 13 to optically scan a scanning surface (a surface to be scanned) 15. A scannable area 16, which is optically scannable by the optical deflector 13, includes an effective scanning area 17. On the scanning surface 15, an optical receiver 18 is disposed within the scannable area 16 and outside the effective scanning area 17. The optical scanning device 10 includes a control device 11, an optical deflector 13, and an optical receiver 18.

The control device 11 is an electronic circuit unit including, for example, a CPU (Central Processing Unit) and an FPGA (Field-Programmable Gate Array). The light source device 12 is a laser device configured to emit laser light, for example. The optical deflector 13 is a MEMS device having a reflecting surface 14, and is configured to move the reflecting surface 14. The scanning surface 15 is the intermediate screen 510 in the image generation unit 520 of the embodiment. The optical receiver 18 is, for example, a PD (Photo Diode) that receives light and outputs a light reception signal. The light source device 12 is the light source unit 530 in the image generation unit 520 of the present embodiment.

The control device 11 generates control signals for controlling the light source device 12 and the optical deflector 13, based on optical scanning information acquired from an external device or the like, and outputs drive signals to the light source device 12 and the optical deflector 13, based on the generated control signals. The control device 11 synchronizes the light source device 12 and the optical deflector 13, and generates control signals for controlling the light source device 12 and the optical deflector 13, based on a signal output from the light source device 12, a signal output from the optical deflector 13, and a light reception signal output from the optical receiver 18.

The light source device 12 emits light from a light source based on a drive signal input from the control device 11.

The optical deflector 13 moves the reflecting surface 14 in at least one of a uniaxial direction (one-dimensional direction) and a biaxial direction (two-dimensional direction) on the basis of a drive signal input from the control device 11, and deflects the light emitted from the light source device 12. The light deflector 13 of the present embodiment may be any light deflecting unit that deflects light at least in a sub scanning direction corresponding to an arrangement direction of scanning lines. Thus, optical scanning in both the main scanning direction and the sub scanning direction corresponding to extending directions of the scanning lines may be performed by one optical deflector, or the optical scanning in the main scanning direction and the optical scanning in the sub scanning direction may be separately performed by different optical deflectors. The drive signal is a signal having a predetermined driving frequency. The optical deflector 13 has a predetermined natural frequency (also referred to as resonance frequency).

Thereby, the reflecting surface 14 of the optical deflector 13 is reciprocated in a biaxial direction within a predetermined range, under the control of the control device 11 based on the image information, which is an example of optical scanning information, for example. Then, the light emitted from the light source device 12 and incident on the reflecting surface 14 may be deflected and optically scanned, such that any desired image may be projected onto the scanning surface 15.

Next, with reference to FIG. 6, a hardware configuration of the optical scanning device will be described as an example.

Figure 6:
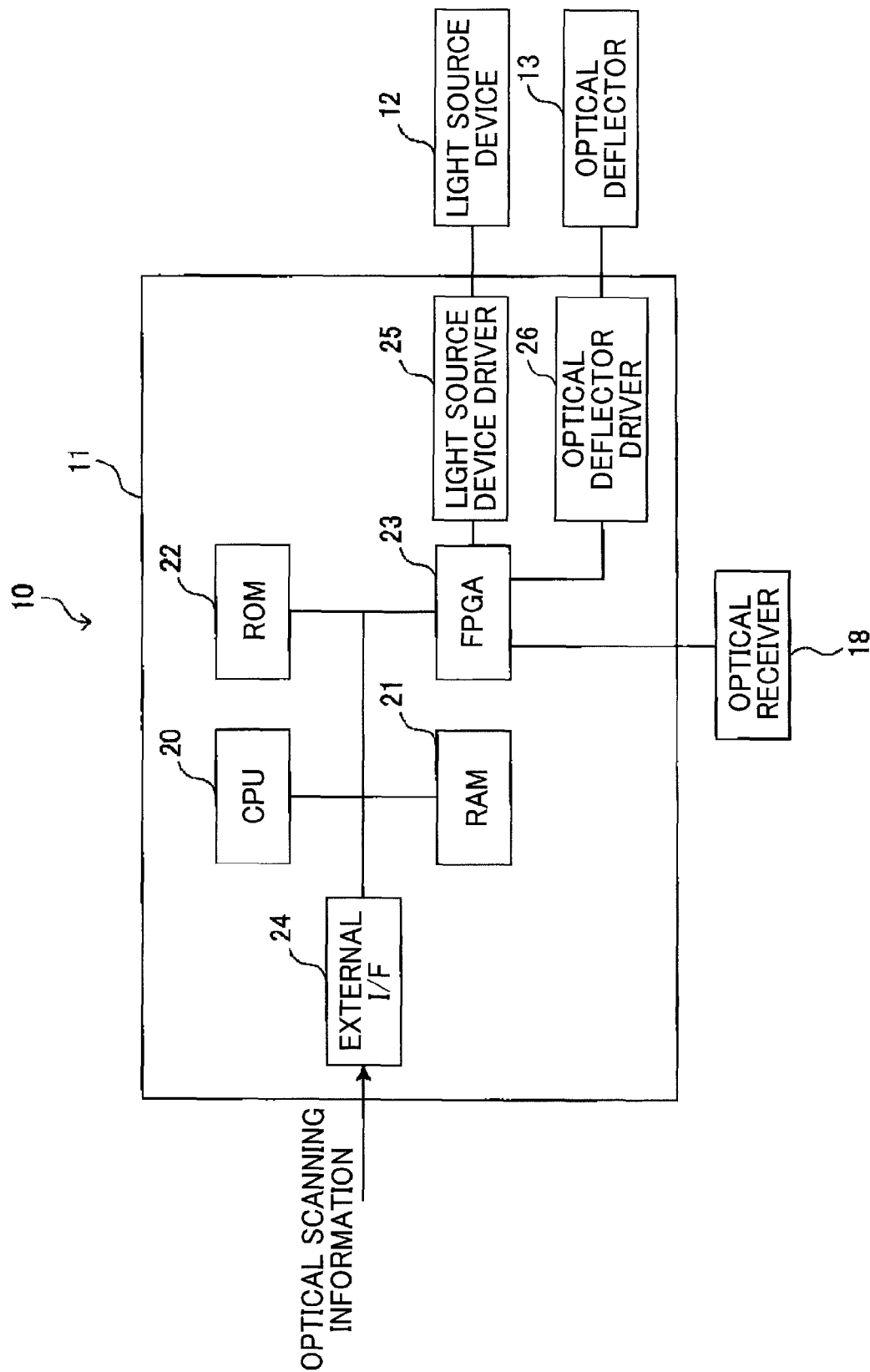
FIG. 6 is a hardware configuration diagram illustrating an example of an optical scanning device.

FIG. 6 is a hardware configuration diagram illustrating an example of the optical scanning device. As illustrated in FIG. 6, the optical scanning device 10 includes a control device 11, a light source device 12, an optical deflector 13, and an optical receiver 18, which are electrically connected to one another. Among these, details of the control device 11 will be described below.

The control device 11 includes a CPU 20, a RAM 21 (Random Access Memory), a ROM 22 (Read Only Memory), an FPGA 23, an external I/F 24, a light source device driver 25, and an optical deflector driver 26.

The CPU 20 is an operation device that reads programs and data from a storage device such as the ROM 22 onto the RAM 21, and executes processing to perform overall control and functions of the control device 11. The RAM 21 is a volatile storage device that temporarily retains programs and data.

The ROM 22 is a nonvolatile storage device capable of retaining programs and data even when the power is turned off, and stores processing programs and data to be executed by the CPU 20 to control respective functions of the optical scanning device 10.

The FPGA 23 is a circuit that outputs control signals suitable for the light source device driver 25 and the optical deflector driver 26, in accordance with the processing of the CPU 20. The FPGA 23 acquires output signals of the light source device 12 and the optical deflector 13 via the light source device driver 25 and the optical deflector driver 26, further acquires a light reception signal from the optical receiver 18, and generates control signals based on the output signals and the light reception signal.

The external I/F 24 is an interface with an external device, a network, or the like, for example. The external device includes, for example, a host device such as a PC (Personal Computer), a storage device such as a USB memory, an SD card, a CD, a DVD, an HDD, and an SSD. The network is, for example, a CAN (Controller Area Network), a LAN (Local Area Network) of an automobile, inter-vehicle communication, the Internet, and the like. The external I/F 24 may have a configuration allowing connection or communication with an external device, and an external I/F 24 may be disposed for each of the external devices.

The light source device driver 25 is an electric circuit that outputs a drive signal such as a drive voltage to the light source device 12 in accordance with the input control signal. The optical deflector driver 26 is an electric circuit that outputs a drive signal such as a drive voltage to the optical deflector 13 in accordance with the input control signal.

In the control device 11, the CPU 20 acquires optical scanning information from an external device or a network via the external I/F 24. It is sufficient that the CPU 20 may be configured to acquire optical scanning information, and the acquired optical scanning information may be stored in the ROM 22 or the FPGA 23 in the control device 11. Alternatively, a storage device such as an SSD may be newly disposed in the control device 11, and the acquired optical scanning information may be stored in the newly added storage device.

Note that the light scanning information is information indicating how the light source device 12 and the light deflector 13 optically scan the scanning surface 15. For example, when an image is displayed by optical scanning, optical scanning information is image data. Further, when optical writing is performed by optical scanning, optical scanning information indicates write data indicating a writing order and a writing place. Furthermore, when object recognition is performed by optical scanning, optical scanning information is light emission data indicating a timing of emitting light for object recognition and a light emission range.

Figure 7:
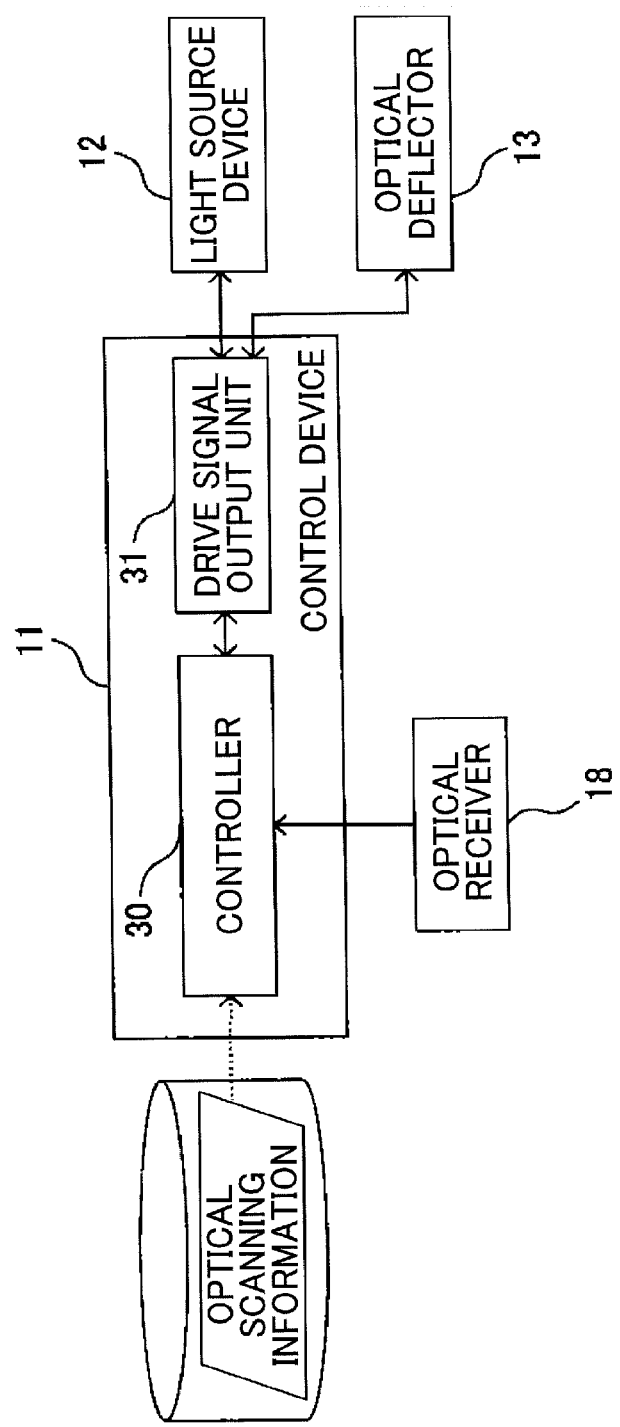
FIG. 7 is a functional block diagram illustrating an example of a control device of an optical scanning device.

Next, with reference to FIG. 7, a functional configuration example of the control device 11 of the optical scanning device 10 will be described. FIG. 7 is a functional block diagram illustrating an example of a control device of the optical scanning device 10. The control device 11 according to the present embodiment is configured to provide functional components described below by instructions from the CPU 20 and hardware components illustrated in FIG. 6.

As illustrated in FIG. 7, the control device 11 has a controller 30 and a drive signal output unit 31 as functions. The controller 30 is a control unit implemented by, for example, the CPU 20, the FPGA 23 and the like. The controller 30 is configured to acquire optical scanning information and a signal from each device, generates a control signal based on the acquired information and signals, and outputs the generated control signal to the driving signal output unit 31.

For example, the controller 30 acquires image data as optical scanning information from an external device or the like, generates a control signal from the image data by a predetermined process, and outputs the control signal to the driving signal output unit 31. The controller 30 also acquires the respective output signals of the light source device 12 and the optical deflector 13 via the drive signal output unit 31, and generates control signals based on the acquired output signals of the light source device 12 and the optical deflector 13. Furthermore, the controller 30 acquires the light reception signal of the optical receiver 18, and generates a control signal based on the acquired light reception signal.

The drive signal output unit 31 is implemented by the light source device driver 25, the optical deflector driver 26, and the like. The drive signal output unit 31 is configured to output a drive signal to the light source device 12 or the optical deflector 13 based on the input control signal. The drive signal output unit 31 functions as, for example, an application unit that applies a drive voltage to the light source device 12 or to the optical deflector 13. The drive signal output unit 31 may be provided for each subject to output a drive signal.

The drive signal is a signal for controlling the driving of the light source device 12 or the optical deflector 13. For example, in the light source device 12, a drive signal is a driving voltage for controlling the irradiation timing and irradiation intensity of the light source. Further, for example, in the optical deflector 13, a drive signal is a driving voltage for controlling the timing and movable range of moving the reflecting surface 14 of the optical deflector 13.

Figure 8:
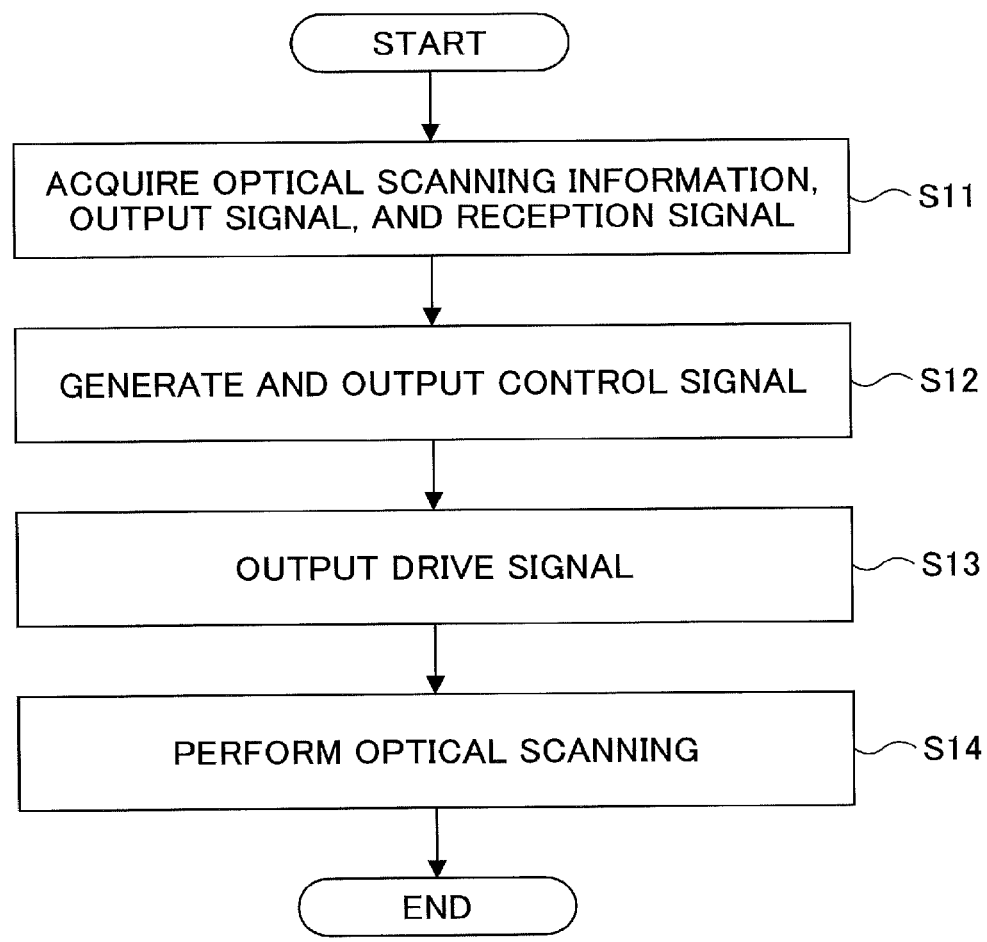
FIG. 8 is a flowchart illustrating an example of a process relating to an optical scanning device.

Next, with reference to FIG. 8, a process of optically scanning a scanning surface 15 performed by the optical scanning device 10 will be described. FIG. 8 is a flowchart illustrating an example of a process relating to the optical scanning device. In step S11, the controller 30 acquires optical scanning information from an external device or the like. The controller 30 also acquires the respective output signals of the light source device 12 and the optical deflector 13 via the drive signal output unit 31, and also acquires the reception signal of the optical receiver 18.

In step S12, the controller 30 generates a control signal from the acquired optical scanning information, respective output signals, and reception signal, and outputs a generated control signal to the drive signal output unit 31. In this step, since the controller 30 may fail to acquire the respective output signals and the reception signal at the time of activation, a predetermined operation may be performed at the time of activation in another step.

In step S13, the drive signal output unit 31 outputs a drive signal to the light source device 12 and to the optical deflector 13, based on the received control signal.

In step S14, the light source device 12 emits light based on the received drive signal. Further, the optical deflector 13 moves the reflecting surface 14 based on the received drive signal. Optical scanning is performed by deflecting light in a desired direction in accordance with the driving of the light source device 12 and the optical deflector 13.

In the optical scanning device 10 of the present embodiment, one control device 11 has a function of controlling the light source device 12 and a function of controlling the optical deflector 13; however, a control device for the light source device and a control device for the optical deflector may be provided separately.

Further, in the optical scanning device 10 of the present embodiment, one control device 11 has a function of the controller 30 for controlling the light source device 12 and a function of the controller 30 for controlling the optical deflector 13, and a function of the drive signal output unit 31. These functions may be provided as separate entities. For example, a drive signal output device having a drive signal output unit 31 may be provided separately from the control device 11 having the controller 30.

Next, a conventional head-up display will be described. The market of applications that allow drivers to recognize alarms and information with less gaze movements of drivers is expected to be increasingly more attractive, and development of an in-vehicle HUD (head-up display) is in progress. In particular, with the progress of in-vehicle sensing technology typified by the term ADAS (Advanced Driving Assistance System), vehicles are configured to capture and incorporate various running environment information and information of passengers. HUD is also attracting attention as "a gateway of ADAS" which conveys the above information to drivers.

However, under severe circumstances where a vehicle stops for about several minutes under the midsummer sun while a large amount of external light (mainly sunlight) enters the HUD, the temperature of the display unit such as the image generation unit 520 may excessively rise. The display unit such as the image generation unit 520 may also be damaged or deform due to the temperature of the enclosure exceeding the heat resistant temperature, which is caused by external light converged by a concave mirror constituting the magnifying optical system.

In recent years, with the expansion of field angle and display area, along with an increase in magnification and an increase in area of the magnifying optical system installed inside the HUD, thermal damage to the display unit and the enclosure may further be increased. The thermal damage results from external light propagating in the opposite direction to the magnifying optical system.

As a configuration for preventing a problem when external light enters the HUD, Japanese Unexamined Patent Publication No. 2006-11168 discloses a configuration for reducing the amount of external light directed to the display unit by a light shielding member disposed on the reflecting surface of the reflecting mirror. In addition, Japanese Unexamined Patent Application Publication No. 2005-331624 discloses a configuration that includes a detection unit for detecting the intensity of external light. In this configuration, when the intensity of external incident light exceeds a predetermined threshold value, the reflecting mirror is rotated to an angular position where external light incident on the reflecting mirror is not reflected toward the display unit. Furthermore, Patent Document 1 discloses a configuration that reduces or turns off the luminance of the backlight of a display unit composed of a liquid crystal display device when the intensity of external incident light exceeds a predetermined threshold value.

However, in conventional HUDs, there is no consideration with respect to a configuration to prevent the temperature, which rises due to external light striking the inner wall of the enclosure, from exceeding the heat resistant temperature of the enclosure.

Figure 9:
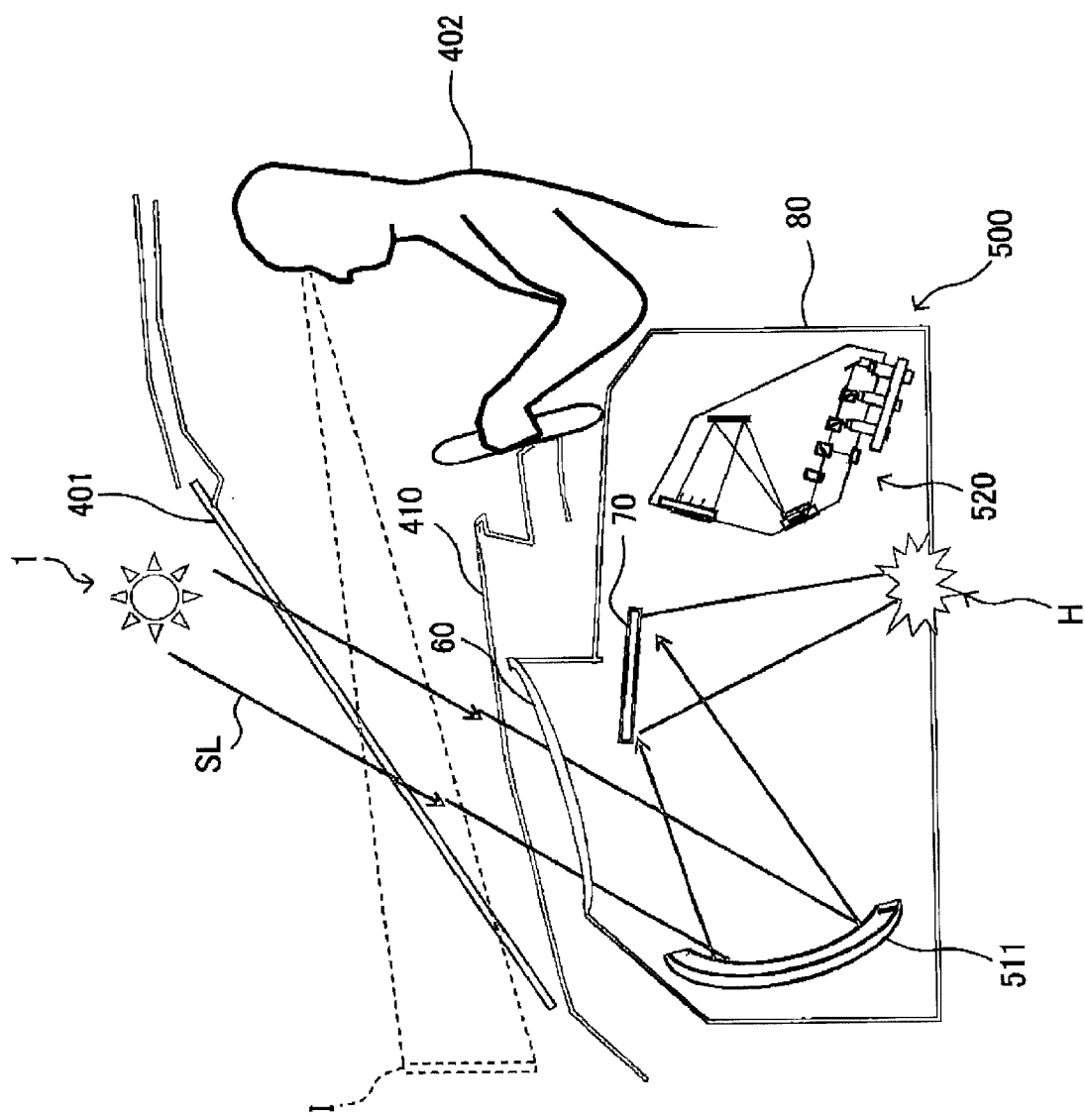
FIG. 9 is a schematic configuration diagram illustrating a problem when sunlight enters a head-up display device.

FIG. 9 is a schematic configuration diagram illustrating a problem when sunlight SL enters the head-up display device 500 to which an embodiment of the present invention illustrated in FIG. 3 may be applied. As illustrated in FIG. 9, the sunlight SL coming from the sun 1 passes through the windshield 401, passes through the dustproof window 60, and enters the projection mirror 511.

As illustrated in FIG. 9, when the sunlight SL incident on the head-up display device 500 enters the projection mirror 511, light reflected by the projection mirror 511 is incident on an inner wall surface of the projection enclosure 80 and the image generation unit 520. The reflected light reflected by the projection mirror 511, which is a concave mirror, is converged, and the irradiance is amplified depending on a distance from the projection mirror 511. The irradiance changes depending on the imaging magnification of the projection mirror 511 and a distance from the projection mirror 511. When the irradiance is amplified, and light with amplified light energy per unit area is incident on the inner wall surface of the projection enclosure 80, as indicated by "H" in FIG. 9, a portion irradiated with light in the projection casing 80 is locally heated. Due to this heating, the temperature of the projection enclosure 80 may partially exceed the heat resistance temperature to damage the projection enclosure 80.

Figure 10:
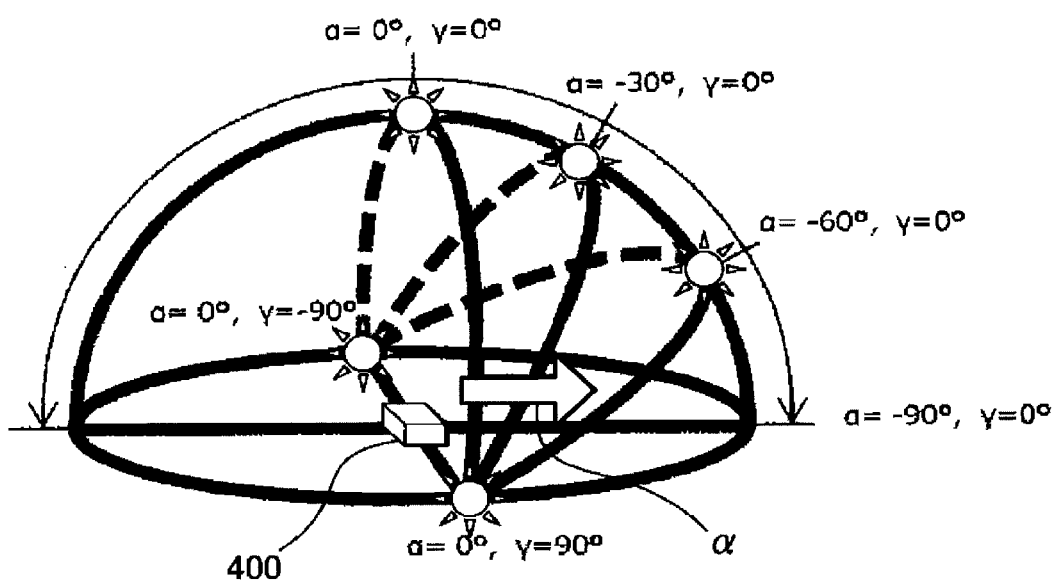
FIG. 10 is a diagram illustrating a concept of predicting sunlight optical paths.

FIG. 10 is a diagram illustrating a concept of predicting sunlight optical paths. Depending on a positional relationship between the automobile 400 and the sun 1, the sunlight SL is incident onto the head-up display device 500 disposed in the automobile 400 from various angles. The optical paths of the incoming sunlight SL can be predicted by simulation. The simulation makes it possible to calculate possible angles at which the sunlight SL enters the head-up display device 500, and to specify possible arrival points of the sunlight SL in the components constituting the head-up display device 500.

Figure 11:
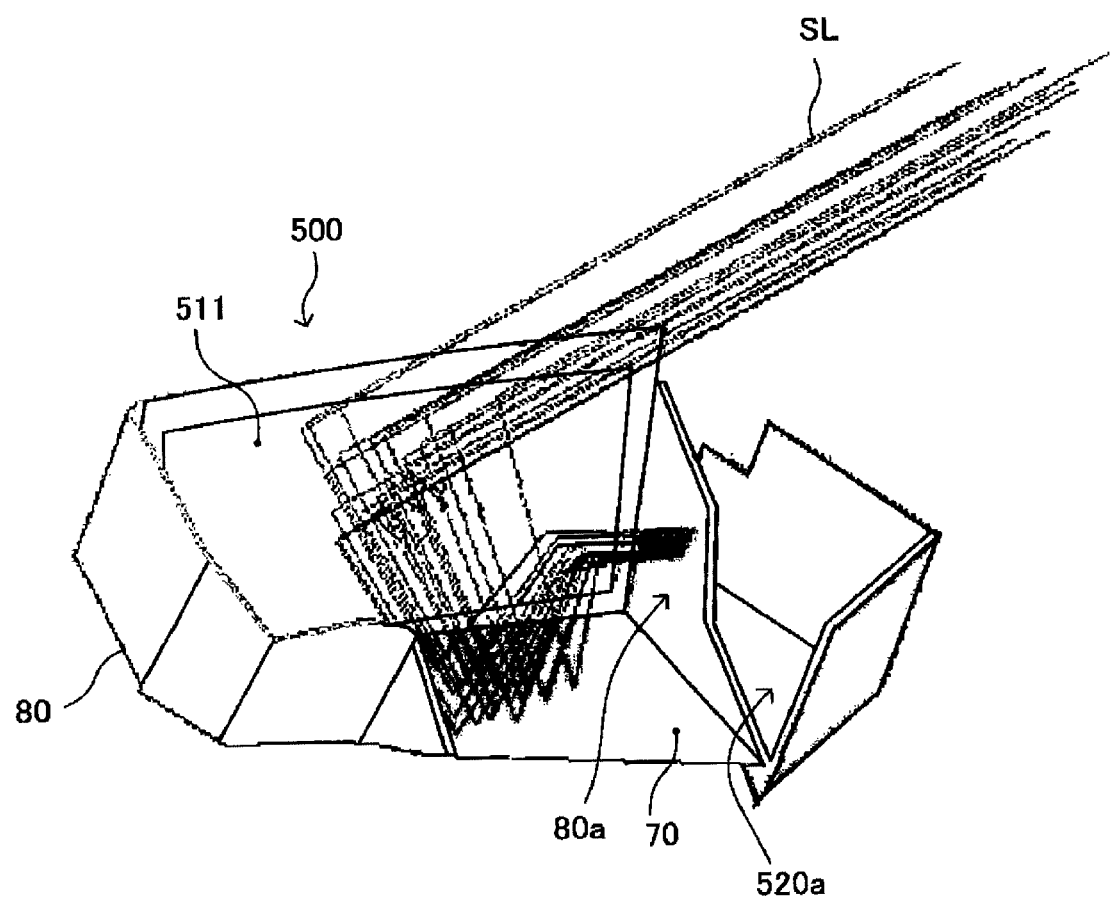
FIG. 11 is a diagram illustrating a simulation result on the basis of assumption in which sunlight is incident on the head-up display device via one of predicted optical paths.

FIG. 11 is a diagram illustrating a simulation result on the basis of assumption that sunlight SL is incident on the head-up display device 500 via one of the predicted optical paths. In FIG. 11, "520*a*" indicates a space for disposing the image generation unit 520 in the projection enclosure 80. In the example illustrated in FIG. 11, the sunlight SL incident on the projection enclosure 80 is reflected by the projection mirror 511 and the cold mirror 70 in this order, reflected again by the projection mirror 511, and strikes an inner wall surface 80*a* of the projection enclosure 80. Further, a spot diameter of sunlight SL when the sunlight SL finally enters the inner wall surface 80*a* is smaller than a diameter of sunlight SL when sunlight SL is incident on the projection mirror 511 and is converged.

In the head-up display device 500, when the sunlight SL enters from a side opposite to a direction in which the virtual image I is projected to the driver 402, the sunlight SL enters the image generation unit 520, and the entered sunlight SL propagates toward the light source unit 530. However, when the sunlight SL is incident from another angle, the sunlight SL reaches structural components other than the inner wall surface 80*a* of the projection enclosure 80 or the image generation unit 520. In this case, irradiance indicating a light energy density varies depending on the converging magnification by the optical system, and the light converging magnification varies according to a distance from the converging optical system. When the light converging magnification is high and the energy entering the projection mirror 511 is large, final sunlight SL arrival points of the components become high temperature, which will exceed the heat resistant temperature of the components to damage the components or lower the strength of the components.

Figure 12:
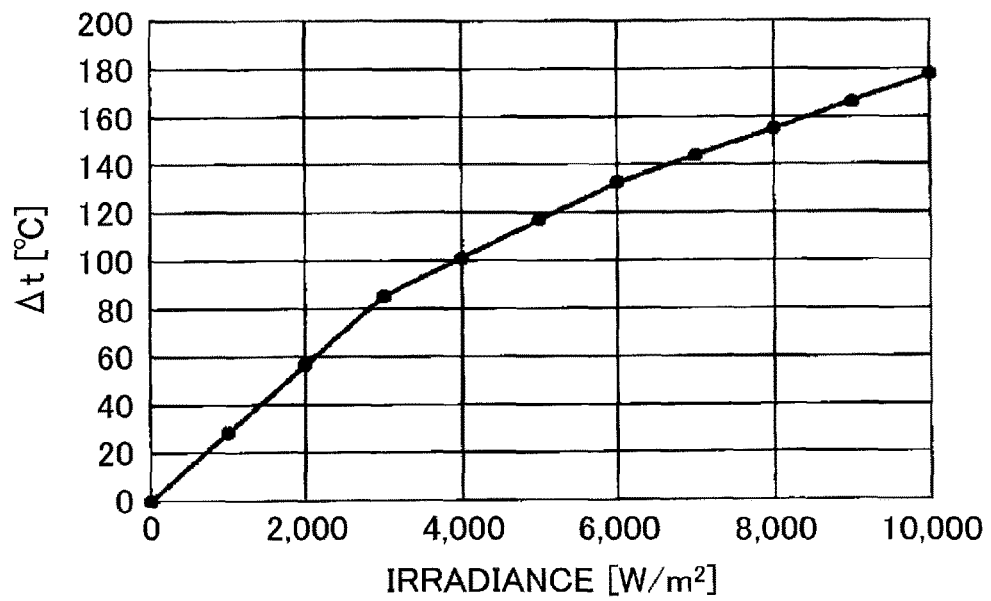
FIG. 12 is a graph illustrating a relationship between irradiance and temperature rise.

FIG. 12 is a graph illustrating a relationship between irradiance and an increase in temperature ($\Delta t$ [° C.]), which is a simulation result illustrating the effect on an increase in temperature when the irradiance rises. The material used is expected to be PBT (polybutylene terephthalate).

In general, the melting temperature of PBT is approximately 224° C., and when the automobile 400 is left under the scorching sun, the temperature inside the automobile 400 will be approximately 90° C. Based on the temperature inside the automobile 400, the temperature $\Delta t$ may be increased up to approximately 110° C. in consideration of the safety factor. The irradiances with respect to temperatures that can be withstood by the material used are at obtained from the graph of FIG. 12.

With reference to FIG. 12, the irradiance corresponding to the increased temperature $\Delta t$ of 110 [° C.] is approximately 4500 [W/m$^2$]. Further, AM (air mass) 1.0 based on the assumption of the amount of solar radiation just under the equator has an irradiance of 1100 [W/m$^2$]. When sunlight SL with an irradiance of 1100 [W/m$^2$] passes through the windshield 401 of the automobile 400, sunlight SL is attenuated by approximately 40% due to the transmittance of the windshield 401. Thus, the irradiance of the sunlight SL after passing through the windshield 401 is approximately 440 [W/m$^2$]. In consideration of the attenuation due to a reflection system such as the cold mirror 70 under the condition that there is no diffusion and convergence from the above condition, upon irradiation with sunlight SL having an irradiance of 1100 [W/m$^2$], the irradiance of sunlight SL reaching the inner wall surface 80*a* of the projection enclosure 80 is approximately 290 [W/m$^2$].

The irradiance of sunlight SL reaching the projection enclosure 80 increases in proportion to the converging magnification of the magnifying optical system having the projection mirror 511. Hence, when the upper limit of irradiance is set to 4500 [W/m$^2$], the allowable converging magnification is approximately 15 times, which is obtained by the following equation (1).

$$4500[W/m^2]/290[W/m^2]=15.5[times] \qquad (1)$$

Figure 13:
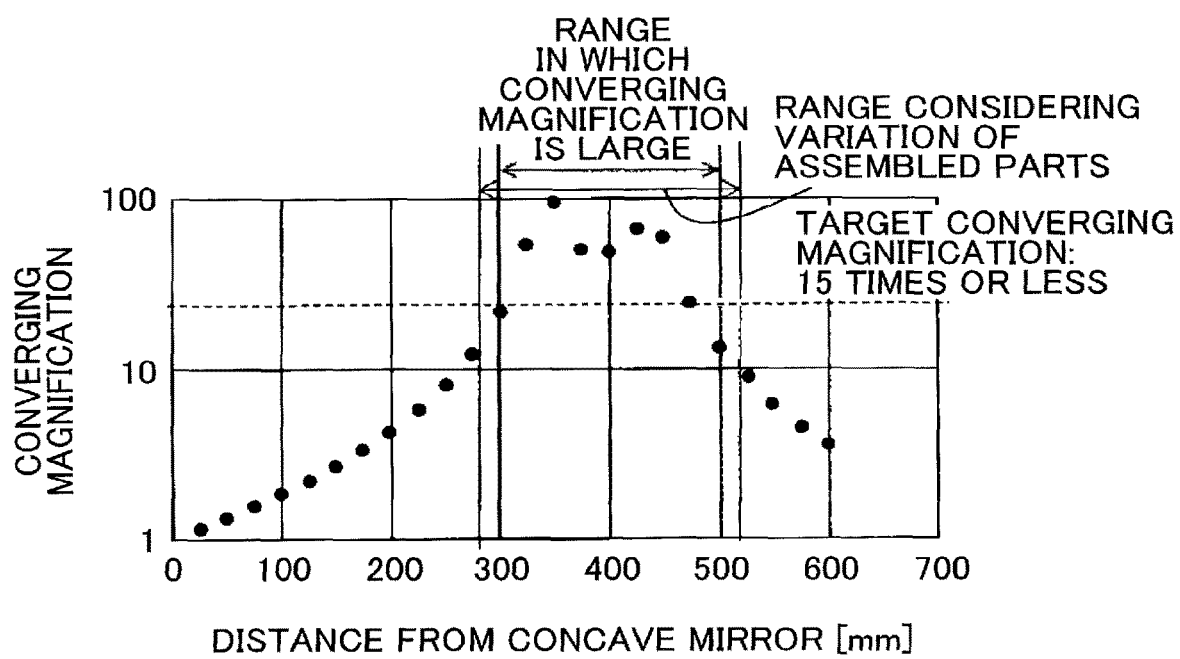
FIG. 13 is a graph illustrating a relationship between a distance from a concave mirror and a converging magnification.

FIG. 13 is a graph illustrating a relationship between a distance from a concave mirror (projection mirror 511) and converging magnification. As illustrated in FIG. 13, the converging magnification varies with a distance from the concave mirror. The converging magnification is high and the energy density (irradiance) of the converged sunlight SL is high in a certain range of a distance from the concave mirror, specifically, in a certain range of a distance in the vicinity of a focal point of the concave mirror. The projection enclosure 80 is a molded article made of resin. When an inner wall surface of the projection enclosure 80 is disposed in a certain range in the vicinity of a focal point of the concave mirror, the projection enclosure 80 is heated by the sunlight SL having high energy density, which raises a temperature of the projection enclosure 80. When the temperature of the projection enclosure 80 exceeds a melting point, the projection enclosure 80 will be thermally damaged.

In FIG. 13, a target converging magnification is set to 15 times or less (indicated by a dashed-dotted line in FIG. 13), and a range in which the converging magnification is 15 times or more (i.e., a range of a distance from the concave mirror being 300 [mm] to 500 [mm]) is defined as "a range in which the converging magnification is large". A range slightly wider than this range (i.e., a range of the distance from the concave mirror being 280 [mm] to 520 [mm]) is defined as "a range considering variation of assembled parts". In the present embodiment, the "range considering variation of assembled parts" is defined as an "area in which the disposition of an inner wall surface is avoided" and is expressed as an "area β".

Figure 14:
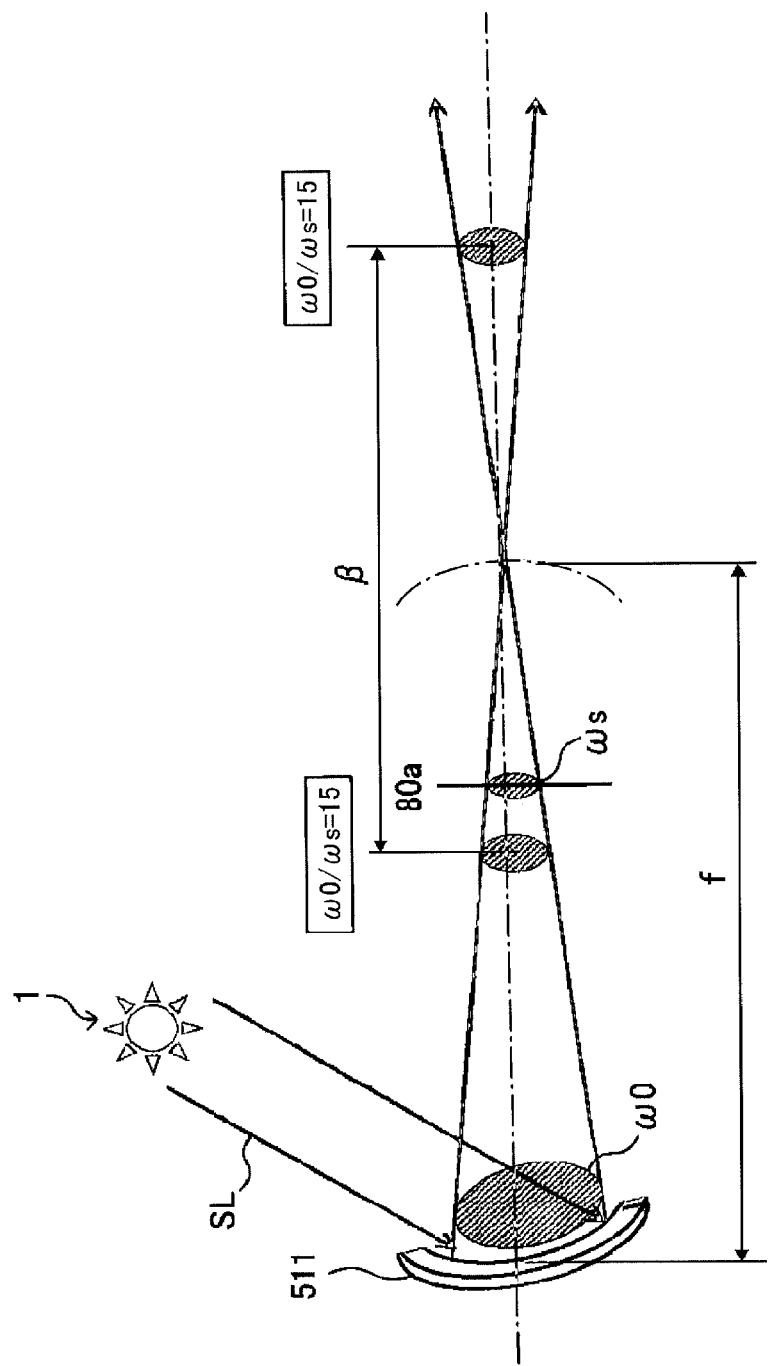
FIG. 14 is a schematic diagram illustrating a relationship between a concave mirror, a focal length, and an area in which disposition of an inner wall surface is avoided on an optical path of sunlight.

FIG. 14 is a schematic diagram illustrating a relationship between a concave mirror (projection mirror 511), a focal length f and an area β with respect to an optical path of sunlight SL. When a diameter in a range where the sunlight SL strikes the concave mirror is "an irradiation diameter on a mirror surface ω0", and a diameter in a range where the sunlight SL reflected by the concave mirror strikes the inner wall surface 80a is "a spot diameter ωs", the converging magnification may be expressed by "ω0/ωs". With absence of a light shielding material, there are two positions at which the converging magnification becomes "15 times" in upstream and downstream of a propagation direction with a focal point between the two positions, and a range sandwiched between these two positions is called "an area β".

In this embodiment, the projection enclosure 80 is designed such that with respect to each of rays of sunlight SL incident from various angles as illustrated in FIG. 10, the converging magnification when the sunlight SL being incident on the inner wall surface 80a of the projection enclosure 80 and other structural components is 15 times or less, which is the target converging magnification.

Specific design countermeasures are illustrated in the following (1) to (4).

(1) In this design of the projection enclosure 80, the inner wall surface 80a is not disposed in the area β, where the converging magnification of sunlight SL by the concave mirror (projection mirror 511) is 15 times or more. In this design, the projection enclosure 80 and other structural components are disposed avoiding the positions where energy concentrates at high density. Thus, it is possible to increase heat dissipation areas with respect to positions attained by sunlight SL, and to prevent a temperature rise even when the sunlight SL incident on the head-up display device 500 strikes the inner wall surface 80a.

(2) In this design of the projection enclosure 80, a light shielding member is disposed so as not to allow the sunlight SL to reach the inner wall surface 80a when the projection enclosure 80 or the structural components need to be disposed in the high-magnification convergence area (area β), where the converging magnification is 15 times or more. The light shielding member is configured to block sunlight SL before the sunlight reaches the inner wall surface 80a. With such a design, it is possible to shield light in an area such that the light converging magnification is 15 times or less. This prevents high energy density sunlight SL from being incident on the inner wall surface 80a and also prevents the temperature of the projection enclosure 80 from rising.

(3) In this design of the projection enclosure 80, a high heat resistant member is used for the light shielding member when the light shielding member needs to be disposed in an area where the converging magnification is 15 times or more. The high heat resistant member is made of a metal material or made of a resin material having a high melting point or the like. With such a design, the projection enclosure 80 will have a structure that can withstand high temperature caused by irradiation with high energy density sunlight SL. In the projection enclosure 80 provided with the high heat resistant member, a high heat conductive member with high heat conductivity may preferably be used for the high heat resistant member. Use of a member having high heat conductivity may increase heat dissipation efficiency at the time of converging sunlight SL, and prevent temperature rise.

(4) In this design of the projection enclosure 80, a cold mirror 70 is disposed in an optical path before the sunlight SL reaches the inner wall surface of the projection enclosure 80, other structural components, or the light shielding member. With such a design, it is possible to cut off a certain proportion of wavelength components in the infrared band that promotes heat generation. Thus, it is possible to reduce energy of the sunlight SL that reaches the inner wall surface of the projection enclosure 80, the other structural components, or the light shielding member, thereby preventing temperature rise.

In the design method (1) to (4) described above, a material having high heat resistance, and the like may be disposed only locally. Thus, it is unnecessary to form the entire projection enclosure 80 or the entire other structural components with a material having high heat resistance, which minimizes the cost increase for forming a configuration that can prevent breakage due to incoming sunlight SL. According to the present embodiment, as illustrated in FIG. 10, the head-up display device 500 is simulated on the basis of assumption that a traveling direction of the automobile 400 is "α" and the sunlight SL is incident from all directions with respect to the automobile 400 facing the traveling direction α. Among the sunlight SL directions incident on the automobile 400, the sunlight SL incident on the projection mirror 511 is reflected by the projection mirror 511, and the area β is specified as an area in which the converging magnification of reflected light, that is, light reflected by the projection mirror 511, is approximately 15 times or more. When the projection enclosure 80 and other structural components are located within the area β, the head-up display device 500 is provided with design countermeasures of at least one of the above (1) to (4).

First Embodiment

Figure 1:
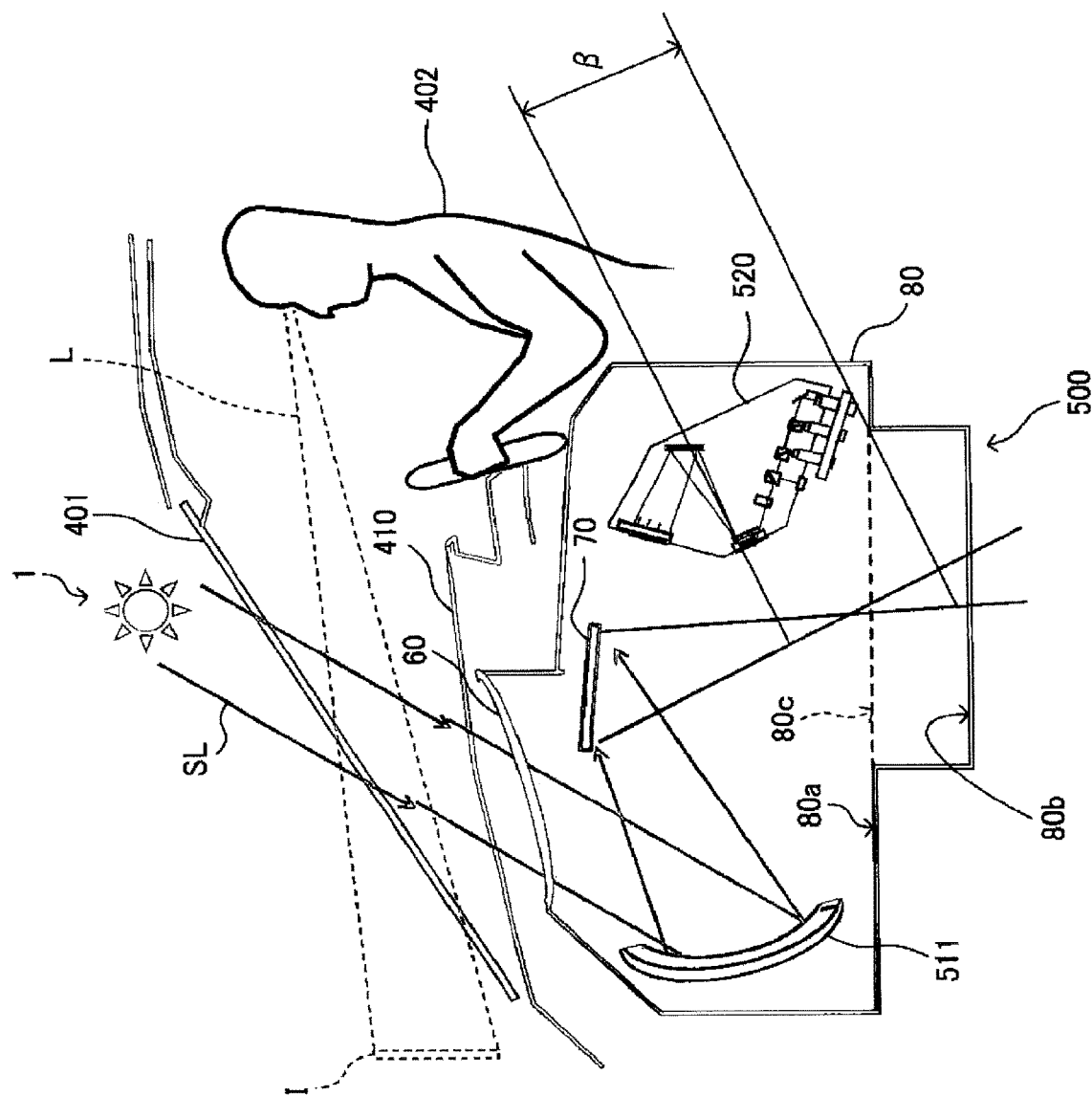
FIG. 1 is a schematic configuration diagram illustrating an example of a head-up display device according to a first embodiment.

Next, a first one (hereinafter referred to as "first embodiment") of the embodiments having at least one of the design countermeasures illustrated in the above items (1) to (4) will be described. FIG. 1 is a schematic configuration diagram of a head-up display device 500 according to a first embodiment. As illustrated in FIG. 1, a portion of the sunlight SL entering the projection enclosure 80 from an incident path outside an extended optical path of the projection light L may be incident on the projection mirror 511 constituting a magnifying optical system. The sunlight SL incident on the projection mirror 511 propagates in a direction opposite to the projection light L, and the propagating incident light is converged by the projection mirror 511. In the first embodiment, as illustrated in FIG. 1, the inner wall surface 80a of the projection enclosure 80 is disposed so as to avoid the area β where the converging magnification of the converged sunlight SL may exceed 15 times. The first embodiment has the above-described countermeasures (1) and (4), and further includes a cold mirror 70, as illustrated in FIG. 1.

Specifically, when a portion of the inner wall surface 80a is continuously formed in line with a peripheral inner wall surface 80a, the position of the continuously formed portion of the inner wall surface 80a corresponds to a broken line "80c" in FIG. 1; however, the position of the broken line "80c" falls within a range of the area β. Thus, in order not to allow the position of the broken line "80c" to fall within a range of the area β, a portion of the inner wall surface 80a is recessed with respect to a periphery of the inner wall surface 80a to form an inner wall surface recess portion 80b. This structure of the inner wall surface 80a having the inner wall surface recess portion 80b is enabled to avoid an area β, where the converging magnification of incident sunlight SL exceeds 15 times. Specifically, the projection enclosure 80 and other structural components are disposed such that the inner wall surface 80a of the projection enclosure 80 and the other structural components are not disposed at a position where a distance from the projection mirror 511 corresponds to the area β on an optical path of the sunlight SL reflected by the projection mirror 511.

The surface of the inner wall surface recess portion 80b is irradiated with the sunlight SL reflected by the projection mirror 511; however, the surface of the inner wall surface recess portion 80b is located outside the area β, which is located away from the focus of the sunlight SL reflected by the projection mirror 511. The above-described structure prevents the inner wall surface 80a from being located within the area β, and lowers the irradiance (energy density) by setting the converging magnification at the position where the sunlight SL is incident on the inner wall surface 80a to less than 15 times. Thus, when a material having a low heat resistance temperature or a material having a low heat conductivity is used for the projection enclosure 80, it is possible to prevent the temperature of the projection enclosure 80 from reaching the melting point leading to thermal damage.

The projection enclosure 80 that is provided with the inner wall surface recess portion 80b protrudes outward as illustrated in FIG. 1. In this structure, only the inner wall surface 80a that would have a portion overlapping the area β is provided with the inner wall surface recess portion 80b, which may minimize a portion that needs to protrude outward, and may prevent the sunlight SL with high converging magnification from reaching the inner wall surface 80a. Thus, it is possible to prevent the size of the projection enclosure 80 from increasing.

Second Embodiment

Figure 15:
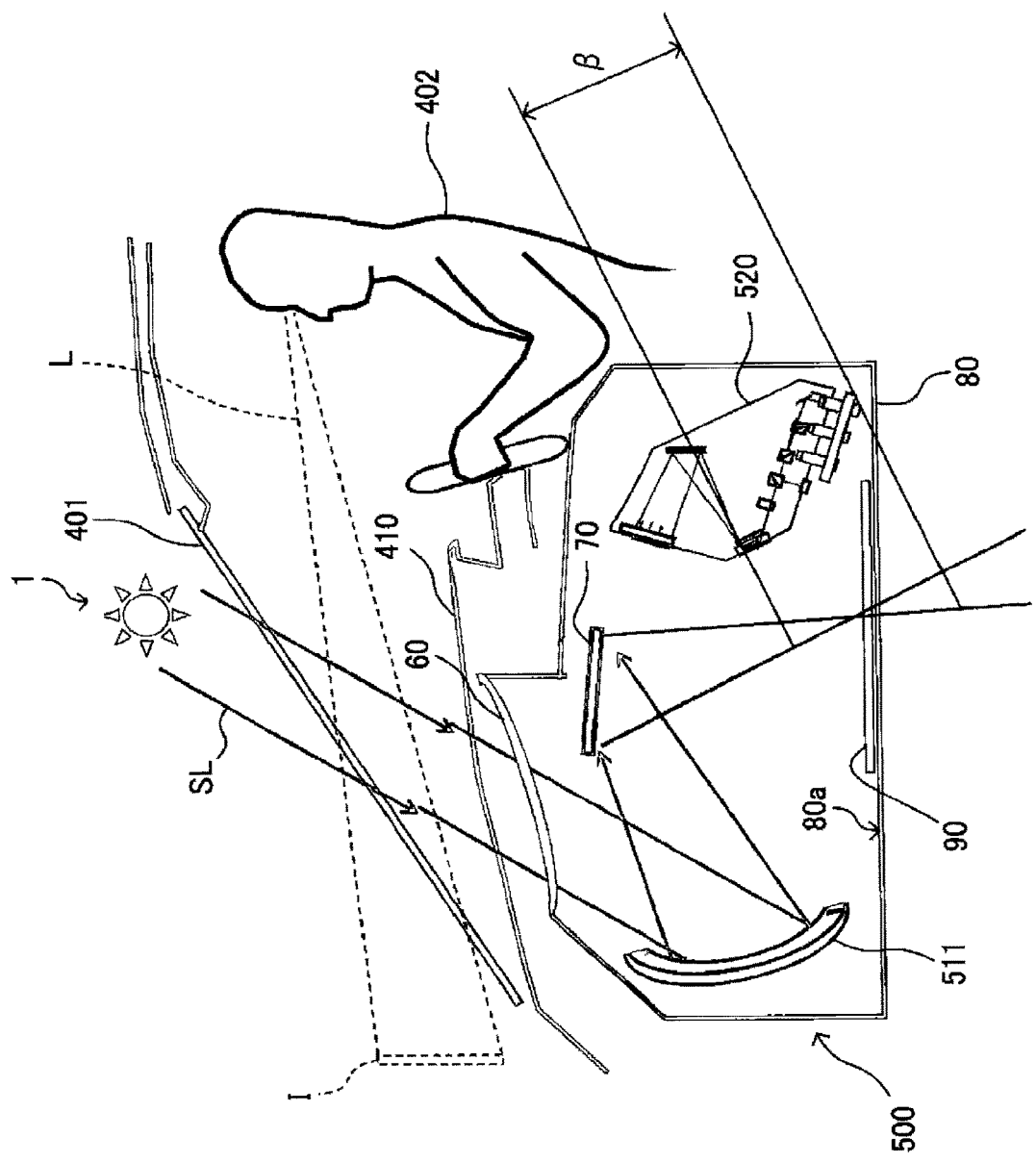
FIG. 15 is a schematic configuration diagram illustrating an example of a head-up display device according to a second embodiment.

Next, a second one (hereinafter referred to as "second embodiment") of the embodiments having at least one of the countermeasures illustrated in the above items (1) to (4) will be described. FIG. 15 is a schematic configuration diagram of a head-up display device 500 according to a second embodiment. As illustrated in FIG. 15, a portion of the sunlight SL entering the projection enclosure 80 from an incident path deviating from extension of an optical path of the projection light L may be incident on the projection mirror 511 constituting the magnifying optical system. The sunlight SL incident on the projection mirror 511 propagates in a direction opposite to the projection light L, and the propagating incident light is converged by the projection mirror 511. In the second embodiment, as illustrated in FIG. 15, a light shielding member 90 is additionally provided so as to prevent sunlight SL from entering the inner wall surface 80a of the projection enclosure 80, which is located in the area β where the converging magnification of the converged sunlight SL may exceed 15 times.

In the second embodiment, by providing the inner wall surface 80a with the light shielding member 90, it is possible to prevent the sunlight SL from being incident on the inner wall surface 80a at a position where an optical path of the sunlight SL is included in the area β. Further, a material (metal or a resin having a high melting point) higher in heat resistance than the resin material that forms the projection enclosure 80 is used for the light shielding member 90. By providing the inner wall surface 80a with the light shielding member 90, it is possible to prevent the sunlight SL from being incident on the inner wall surface 80a located within the area β. Thus, when a material having a low heat resistance temperature or a material having low heat conductivity is used for the projection enclosure 80, it is possible to prevent the temperature of the projection enclosure 80 from reaching the melting point leading to thermal damage.

By using a material higher in heat resistance than the projection enclosure 80 for the light shielding member 90, even when the light converging magnification by the projection mirror 511 is increased and the temperature of the light shielding member 90 is increased, the projection enclosure 80 is prevented from being damaged by the irradiated sunlight SL. By using a member having a higher heat resistance than the projection enclosure 80, that is, by using a member having a higher melting point than the projection enclosure 80 as a material for the light shielding member 90, it is possible to reduce an area where the light shielding member 90 cannot be disposed. Thus, the inner wall surface 80a and other structural component may be more flexibly disposed, such that the size of the projection enclosure 80 may be reduced.

By using a material having a higher photothermal conductivity than the projection enclosure 80 for the light shielding member 90, even when the converging magnification by the projection mirror 511 is high, it is possible to diffuse heat by the light shielding member 90, thereby preventing the temperature of the projection enclosure 80 from rising. Thus, it is possible to prevent the projection enclosure 80 from being damaged by irradiation with the sunlight SL even with a configuration in which the projection image generated by the image generation unit 520 is enlarged at a high magnification and the converging magnification tends to increase. Since a temperature rise in the projection enclosure 80 is reduced by the heat dissipation from the light shielding member 90, and the flexibility in the arrangements of the inner wall surface 80a and other structural components is improved, it is possible to reduce the size of the projection enclosure 80.

In the second embodiment, when the size or shape of the projection enclosure 80 is unable to be changed, or the inner wall surface 80a is unable to be arranged avoiding the area β due to some restrictions, it is possible to prevent the inner wall surface 80a from being irradiated with sunlight having a high converging magnification by disposing the light shielding member 90. In addition, it is possible to minimize the cost increase for a configuration that can prevent breakage due to incident sunlight SL by locally disposing a member having at least one of characteristics of higher heat resistance and higher heat conductivity than the projection enclosure 80 as a light shielding member 90.

As described above, in this embodiment, it is assumed that sunlight SL is incident from all directions, and the amount of energy of sunlight SL incident on windshield 401 varies with the angle of incident light. Further, the amount of energy of the sunlight SL passing through the windshield 401 varies with the angle of incident light and the amount of energy of the sunlight SL entering the projection mirror 511 also varies with the angle of incident light. Thus, in the inner wall surface 80a located at a position where the incident sunlight SL enters from an angle at which the incident energy of the sunlight SL is small, a component for preventing irradiation with the sunlight SL may be unnecessary even in an area where the light converging magnification is 15 times or more.

Hence, simulation may be performed to specify the area β only with respect to the sunlight SL incident on the projection mirror 511 and incident at an incident angle at which the amount of energy, when converged, is likely to thermally damage the projection enclosure 80. In this case, simulation for calculating a range where the converging magnification is 15 times is not performed with respect to the sunlight SL incident from the incident angle at which the energy amount is small, and a component for preventing light with the converging magnification exceeding 15 times from entering the inner wall surface 80a is not provided.

As a component for preventing sunlight SL with high converging magnification from entering the inner wall surface 80a, disposing a duct member for covering an optical path of the projection light L may be considered. By providing such a duct member, the sunlight SL reflected by the projection mirror 511 strikes an inner wall surface of the duct member before the converging magnification becomes high, and the reflected light is blocked. Thus, it is possible to prevent the sunlight SL having a high converging magnification from entering the inner wall surface 80a. However, in the configuration with the duct member, the duct member is provided along an optical path having a complex shape, making it difficult to form the projection enclosure 80 with fewer components. As a result, it is necessary to form the projection enclosure 80 with a large number of components. When the number of components forming the projection enclosure 80 increases, the assembling accuracy of the image generation unit 520 held by the projection enclosure 80 and members of the optical system may be lowered. Further, an installation position of each member may be restricted, and layout flexibility of the image generation unit 520 and the members of the optical system may be reduced in order to provide the duct member.

By contrast, in the present embodiment, in order to prevent a temperature rise without disposing the duct member, a recess portion or a light shielding member 90 may be provided with respect to a portion of the inner wall surface 80a where the converging magnification of the incident sunlight SL may be 15 or more. By locally providing a component for preventing a temperature rise in a limited area, it is possible to form the projection enclosure 80 with fewer components, to manufacture the projection enclosure 80 easily, to enhance the assembling accuracy and the layout flexibility of the image generation unit 520 and members of the optical system, and to reduce the size of the projection enclosure 80. The projection enclosure 80 is formed by a main body portion that holds the image generation unit 520 and members of the optical system, and a lid portion that covers an opening of the main body portion. This configuration enables the image generation unit 520 and the members of the optical system to be held with a single component (main body), thereby maintaining the assembling accuracy.

In the present embodiment, the projection image formed by the projection light L reflected by the windshield 401 of the automobile 400 is visually perceived by the driver 402; however, the present invention is not limited to this example. A combiner (an example of a transparent plate) dedicated to the head-up display device 500 may be provided inside the windshield 401, and the projection light L may be reflected by the combiner to allow a driver 402 to visually perceive the projection image.

Further, the head-up display device 500 is not necessarily installed in the dashboard 410, and may be of a type installed on the dashboard 410.

The image generation unit 520 in the above-described embodiment is a laser scanning type image generation unit for emitting laser light to form a projection image. The image generation system for forming a projection image is not limited to the laser scanning type image generation unit. Any image generation system may be used insofar as an image generation system forms a projection image by projecting light onto a projection plane of the windshield 401 or the like via the magnifying optical system. For example, a liquid crystal display type image generation system in which a liquid crystal is illuminated with a backlight to display a projection image may also be used.

Further, the image projection device may be used not only for an automobile but also for other moving bodies such as an aircraft, a ship, a mobile robot, or for non-moving bodies such as a working robot for operating a driving object such as a manipulator without moving from the site.

The above illustrations are merely examples, and specific effects may be provided for each of the following modes.

(Aspect 1)

An image projection device such as the head-up display device 500, includes an image generation unit such as an image generation unit 520 configured to generate a projection image such as projection light L;

a magnifying optical system such as a projection mirror 511 configured to magnify the projection image generated by the image generation unit and project the magnified image onto a projection surface such as a windshield 401; and an enclosure such as a projection enclosure 80 configured to accommodate the image generation unit and the magnifying optical system, wherein an inner wall surface such as an inner wall surface 80a of the enclosure is disposed avoiding an area such as an area β where converging magnification of the incident light exceeds 15 times, the converged incident light resulting from incident light such as sunlight SL incident from outside of the enclosure onto the magnifying optical system is converged by being propagated in a direction opposite to the projection image.

According to this configuration, as described in the first embodiment, conversing magnification of incident light at a position where the inner wall surface is irradiated with incident light is less than 15 times, thereby lowering the irradiance. According to this configuration, when a material having a low heat resistance temperature or a material having low heat conductivity is used for the enclosure, it is possible to prevent a temperature of the enclosure from reaching a melting point leading to thermal damage.

(Aspect 2)

The image projection device according to aspect 1, wherein a portion (an inner wall surface recess portion 80b, etc.) of the inner wall surface of the enclosure is recessed with respect to a periphery of the inner wall surface such that the inner wall surface has a shape capable of avoiding an area where the converging magnification of the incident light exceeds 15 times. According to this configuration, as described in the first embodiment, it is possible to provide an enclosure having a shape that can avoid an area where the converging magnification of incident light on the inner wall surface exceeds 15 times.

(Aspect 3)

The image projection device according to aspect 1 or 2, further includes a light shielding member configured to shield light such as a light shielding member 90 is disposed such that incident light does not reach the inner wall surface of the enclosure located in an area where the converging magnification of the incident light exceeds 15 times.

According to this configuration, as described in the second embodiment, it is possible to prevent incident light having a high energy density from reaching the inner wall surface of the enclosure, thereby avoiding thermal damage of the enclosure. In addition, it is possible to reduce temperature rise of the enclosure itself and a temperature rise inside the enclosure due to thermal diffusion from the enclosure.

(Aspect 4)

An image projection device such as the head-up display device 500, includes an image generation unit such as an image generation unit 520 configured to generate a projection image such as projection light L;

a magnifying optical system such as a projection mirror 511 configured to magnify the projection image and project the magnified image onto a projection surface such as a windshield 401; and an enclosure such as a projection enclosure 80 configured to accommodate the image generation unit and the magnifying optical system, wherein a light shielding member configured to shield light such as a light shielding member 90 is disposed such that incident light does not reach the inner wall surface such as an inner wall surface 80a of the enclosure located in an area such as an area β where converging magnification of the incident light exceeds 15 times, the converged incident light resulting from incident light such as sunlight SL incident from outside of the enclosure onto the magnifying optical system is converged by being propagated in a direction opposite to the projection image.

According to this configuration, as described in the second embodiment, it is possible to prevent incident light having a high energy density from reaching the inner wall surface of the enclosure, thereby avoiding thermal damage of the enclosure. In addition, it is possible to reduce a temperature rise of the enclosure itself and a temperature rise inside the enclosure due to thermal diffusion from the enclosure. Furthermore, by using a heat resistant material for the light shielding member, use of expensive heat resistant material can be limited only to the light shielding member, and cost increase can be reduced to the minimum.

(Aspect 5)

The image projection device according to any one of aspects 1 to 4, wherein the magnifying optical system has a concave mirror such as a projection mirror 511, and an area where converging magnification of incident light exceeds 15 times is an area where a distance (length) from the concave mirror on an optical path of the incident light that has been reflected by the concave mirror falls within a predetermined range (280 [mm] to 520 [mm], etc.).

According to this configuration, as described in the above embodiment, an area where converging magnification of incident light exceeds 15 times can be specified by a distance from the concave mirror, and in the specified area, the inner wall surface of the enclosure is configured such that the inner wall surface of the enclosure is not irradiated with incident light. This configuration makes it possible to prevent temperature rise of the enclosure, and also to prevent thermal damage of the enclosure.

(Aspect 6)

An image projection device such as the head-up display device 500, includes an image generation unit such as an image generation unit 520 configured to generate a projection image such as projection light L;

a magnifying optical system such as a projection mirror 511 configured to magnify the projection image and project the magnified image onto a projection surface such as a windshield 401; and an enclosure such as a projection enclosure 80 configured to accommodate the image generation unit and the magnifying optical system, wherein the magnifying optical system has a concave mirror such as a projection mirror 511, and an inner wall surface such as an inner wall surface 80a of the enclosure is disposed avoiding an area such as an area β where a distance from a concave mirror, of an optical path of incident light after the incident light such as sunlight SL incident from outside of an enclosure onto the magnifying optical system is reflected by the concave mirror, falls within a predetermined range, or a light shielding member configured to shield light is disposed such that the incident light does not reach the inner wall surface located in the area.

According to this configuration, as described in the above embodiment, by setting a predetermined distance is set to a distance in the vicinity of a focal point of light reflected by the concave mirror, incident light having a high energy density can be prevented from reaching the inner wall surface of the enclosure located at a predetermined distance, and thermal damage of the enclosure can be prevented.

(Aspect 7)

The image projection device according to any one of aspects 3, 4 or 6, wherein the light shielding member is made of a material (metal or the like) higher in heat resistance than the enclosure.

According to this configuration, as described in the second embodiment, an area in which the light shielding member cannot be disposed can be reduced, and the flexibility in designing the inner wall surface and other structural components can be improved. Thus, it is possible to reduce the size of the enclosure.

(Aspect 8)

The image projection device according to any one of aspects 3, 4, 6, or 7, wherein the light shielding member is made of a material having higher heat conductivity than the enclosure.

According to this configuration, as described in the second embodiment, a temperature rise inside the enclosure can be reduced by the heat dissipation by the light shielding member, and the flexibility in designing the inner wall surface and other structural components can be improved. Thus, it is possible to reduce the size of the enclosure.

(Aspect 9)

The image projection device according to any one of aspects 1 to 8, wherein
the magnifying optical system includes a cold mirror such as a cold mirror 70.

According to this configuration, as described in the above embodiment, a wavelength component of an infrared region contributing to heat generation of incident light can be cut off. Thus, infrared energy reaching the inner wall surface of the enclosure or the light shielding member can be attenuated, and a temperature rise of the enclosure can be reduced.

(Aspect 10)

A moving body such as automobile 400 includes
a moving unit such as a driving source and a driving wheel; and
an image projection unit configured to project an image onto a projection surface such as a windshield 401, wherein
an image projection device such as the head-up display device 500 according to any one of the aspects 1 to 9 is provided as the image projection unit. According to this configuration, as described in the above embodiments, it is possible to provide a moving body including an image projection device capable of preventing damage even when sunlight is incident on the image projection device.

Advantageous Effects of Invention

According to the embodiments of the present invention, an excellent effect of preventing an enclosure accommodating respective members of an image projection device from being heated and damaged by external light incident on the enclosure is provided.

The present invention is not limited to the specifically disclosed embodiments, and variations and modifications may be made without departing from the scope of the present invention.

What is claimed is:

1. An image projection device, comprising:
an image generation unit, including at least one light source and an optical deflector, configured to generate a projection image;
a magnifying optical system configured to magnify the projection image generated by the image generation unit and project the magnified projection image onto a projection plane, wherein the magnifying optical system is configured to converge incident light to have a converging magnification exceeding 15 times in a particular area located within a predetermined distance range from the magnifying optical system along an optical path of the incident light; and
an enclosure having an inner wall surface, and being configured to accommodate the image generation unit and the magnifying optical system, wherein
the inner wall surface of the enclosure is disposed so as to be outside the particular area where the converging magnification of the converged incident light exceeds 15 times, the converged incident light resulting from incident light incident from outside of the enclosure onto the magnifying optical system being propagated in a direction opposite to the projection image.

2. The image projection device according to claim 1, wherein
a portion of the inner wall surface of the enclosure is recessed with respect to a periphery of the inner wall surface such that the inner wall surface has an overall shape to avoid the particular area where the converging magnification of the converged incident light exceeds 15 times.

3. The image projection device according to claim 1, further comprising
a light shielding member made of a material configured to shield light, the light shielding member being disposed such that the incident light does not reach the inner wall surface located in the particular area where the converging magnification of the converged incident light exceeds 15 times.

4. An image projection device, comprising:
an image generation unit, including at least one light source and an optical deflector, configured to generate a projection image;
a magnifying optical system configured to magnify the projection image generated by the image generation unit and project the magnified projection image onto a projection plane, wherein the magnifying optical system is configured to converge incident light to have a converging magnification exceeding 15 times in a particular area located within a predetermined distance range from the magnifying optical system along an optical path of the incident light;
an enclosure configured to accommodate the image generation unit and the magnifying optical system; and
a light shielding member made of a material configured to shield light, the light shielding member being disposed in the particular area such that incident light does not reach the inner wall surface, which is also located in the particular area where the converging magnification of the converged incident light exceeds 15 times, the converged incident light resulting from incident light incident from outside of the enclosure onto the magnifying optical system being propagated in a direction opposite to the projection image.

5. The image projection device according to claim 1, wherein
the magnifying optical system has a concave mirror, and
the particular area where the converging magnification of the converged incident light exceeds 15 times is an area where a distance from the concave mirror, along the optical path of the incident light that has been reflected by the concave mirror, falls within the predetermined distance range.

6. An image projection device, comprising:
an image generation unit, including at least one light source and an optical deflector, configured to generate a projection image;
a magnifying optical system including a concave mirror and configured to magnify the projection image generated by the image generation unit and project the magnified projection image onto a projection plane, wherein the concave mirror is configured to converge incident light to have a converging magnification exceeding a predetermined threshold in a predetermined area located within a predetermined distance range around the focal point of the concave mirror along an optical path of the incident light; and
an enclosure having an inner wall surface and being configured to accommodate the image generation unit and the magnifying optical system, wherein
the inner wall surface of the enclosure is disposed to be outside the particular area at a certain distance from the concave mirror along the optical path of the incident light, which is incident from outside of the enclosure onto the magnifying optical system that has been reflected by the concave mirror, the certain distance being beyond the predetermined range along the optical path.

7. The image projection device according to claim 3, wherein the material has a higher heat resistance than the enclosure.

8. The image projection device according to claim 3, wherein the material has a higher heat conductivity than the enclosure.

9. The image projection device according to claim 1, wherein the magnifying optical system includes a cold mirror.

10. A moving body, comprising:
    a moving unit, including at least one light source and an optical deflector; and
    an image projection unit configured to project an image onto a projection surface, wherein
    the image projection device according to claim 1 is provided as the image projection unit.

11. The image projection device of claim 1, wherein the inner wall surface is disposed so as to receive the incident light incident from the outside of the enclosure.

\* \* \* \* \*